United States Patent
Just (10) Patent No.: US 12,541,803 B2
(45) Date of Patent: *Feb. 3, 2026

(54) SYSTEMS AND METHODS FOR EXTRACTING INFORMATION FROM A TRANSACTION DESCRIPTION

(71) Applicant: Capital One Services, LLC, McLean, VA (US)

(72) Inventor: Richard Just, Berkeley, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,292

(22) Filed: Feb. 16, 2024

(65) Prior Publication Data
US 2024/0193699 A1    Jun. 13, 2024

Related U.S. Application Data

(63) Continuation of application No. 17/667,660, filed on Feb. 9, 2022, now Pat. No. 11,935,136, which is a continuation of application No. 16/580,757, filed on Sep. 24, 2019, now Pat. No. 11,263,702, which is a continuation of application No. 15/975,189, filed on May 9, 2018, now Pat. No. 10,430,893, which is a continuation of application No. 14/162,850, filed on Jan. 24, 2014, now Pat. No. 10,089,697.

(60) Provisional application No. 61/756,679, filed on Jan. 25, 2013.

(51) Int. Cl.
*G06Q 40/12*    (2023.01)

(52) U.S. Cl.
CPC ................................. *G06Q 40/12* (2013.12)

(58) Field of Classification Search
None
See application file for complete search history.

(56) References Cited

U.S. PATENT DOCUMENTS 6,040,920 A  *  3/2000  Ichiriki ............. H04N 1/32771
                                                        358/403
7,912,357 B2 *  3/2011  Jung ................. H04N 21/4341
                                                        386/346
8,498,915 B2 *  7/2013  Eder ...................... G06Q 40/06
                                                        705/37

(Continued)

*Primary Examiner* — Fateh M Obaid
(74) *Attorney, Agent, or Firm* — Foley & Lardner LLP (57) ABSTRACT

The disclosed embodiments include systems and methods for extracting information from a transaction description. In one embodiment, a system is disclosed that may include one or more processors and one or more memory devices storing instructions that, when executed by the one or more processors, performs operations consistent with the disclosed embodiments. In one embodiment, the operations may include receiving a transaction description. The operations may also include identifying known location information corresponding to the transaction description and determining whether information from the transaction description corresponds to the identified known location information. The operations may further include removing location information from the transaction description based on the determination. In another aspect, the operations may also include extracting additional location information from the transaction description that is not associated with the known location information.

20 Claims, 5 Drawing Sheets

(56) References Cited

U.S. PATENT DOCUMENTS

| | | | |
|---|---|---|---|
| 2003/0135826 A1* | 7/2003 | Dozier | G06F 16/9558 |
| | | | 707/E17.074 |
| 2004/0083242 A1* | 4/2004 | Ye | G06F 16/258 |
| 2006/0155638 A1* | 7/2006 | de la Motte | G06Q 40/04 |
| | | | 705/37 |
| 2006/0161564 A1* | 7/2006 | Pierre | G06F 16/972 |
| 2007/0034682 A1* | 2/2007 | Williams | G06Q 20/40 |
| | | | 235/379 |
| 2008/0175479 A1* | 7/2008 | Sefton | G06V 20/63 |
| | | | 382/182 |
| 2008/0285517 A1* | 11/2008 | Igarashi | H04M 1/72436 |
| | | | 370/331 |
| 2009/0043637 A1* | 2/2009 | Eder | G06N 7/01 |
| | | | 705/37 |
| 2013/0325680 A1* | 12/2013 | Satyavolu | H04M 15/58 |
| | | | 705/35 |
| 2014/0003717 A1* | 1/2014 | Brito | G06V 30/412 |
| | | | 382/218 |

* cited by examiner

SYSTEMS AND METHODS FOR EXTRACTING INFORMATION FROM A TRANSACTION DESCRIPTION

CROSS-REFERENCE TO RELATED APPLICATIONS

This application is a continuation of U.S. patent application Ser. No. 17/667,660, filed Feb. 9, 2022, which is a continuation of U.S. patent application Ser. No. 16/580,757, filed Sep. 24, 2019, which is a continuation of Ser. No. 15/975,189, filed May 9, 2018, which is a continuation of U.S. patent application Ser. No. 14/162,850, filed Jan. 24, 2014, which claims the benefit of priority under 35 U.S.C. § 119 to U.S. Provisional Application No. 61/756,679, filed on Jan. 25, 2013, which applications are incorporated herein in their entirety by reference.

TECHNICAL FIELD

The disclosed embodiments generally relate to systems and methods for using financial transaction data and, more particularly, to extracting information from a transaction description.

BACKGROUND

Current technology provides financial service providers with an abundance of information associated with transactions initiated by their customers. Each time a customer conducts a transaction, such as a purchase at a retail merchant, their financial service provider typically receives a transaction description that describes the transaction. But the format and contents of transaction descriptions may widely vary depending on, for example, the merchant that generated the description. Each individual merchant may select which transaction details (e.g., transaction amount, merchant location, etc.) to include and in what format to include them, as well as add their own internal codes and/or other merchant-specific information to the description.

The resulting transaction descriptions may be alphanumeric strings of data that can be difficult to decipher, such as to identify specific transaction information contained in the description. For example, the location of the transaction, merchant name, contact information, and the like, may be difficult to determine by just looking at the description. Therefore, a need exists for systems and methods for processing transaction descriptions to extract information from them.

SUMMARY

Consistent with disclosed embodiments, systems and methods are provided for extracting information from a transaction description.

Consistent with a disclosed embodiment, a system for extracting location information from a transaction description is provided. The system may include one or more processors, and one or more memory devices storing instructions that, when executed by the one or more processors, performs operations that may include receiving a transaction description, identifying known location information corresponding to the transaction description, and determining whether information from the transaction description corresponds to the identified known location information. The operations may also include removing location information from the transaction description based on the determination, and extracting additional location information from the transaction description that is not associated with the known location information.

Consistent with another disclosed embodiment, a computer-implemented method for extracting location information from a transaction description is provided. The computer-implemented method may include receiving, by one or more processors, a transaction description, identifying, by the one or more processors, known location information corresponding to the transaction description, and determining, by the one or more processors, whether information from the transaction description corresponds to the identified known location information. The computer-implemented method may also include removing, by the one or more processors, location information from the transaction description based on the determination, separating the transaction description into alphanumeric strings, and extracting, by the one or more processors, additional location information from the transaction description that is not associated with the known location information.

It is to be understood that both the foregoing general description and the following detailed description are exemplary and explanatory only and are not restrictive of the disclosed embodiments, as claimed. For example, although disclosed embodiments are discussed primarily in the context of cleansing and/or supplementing transaction descriptions, other applications are contemplated. For example, disclosed embodiments may also be used in the context of cleaning and/or supplementing database system data including, for example, data stored for use in generating targeted advertising.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments include systems and methods for extracting information from a transaction description. Certain embodiments are directed to processing transaction descriptions associated with purchase transactions provided by, for example, merchants of a purchased product and/ service. Some embodiments may automatically cleanse location information from a transaction description of a customer purchase to isolate a merchant name associated with a purchase. Some embodiments may further provide for supplementing known information about a customer purchase with data extracted from a transaction description.

Figure 1:
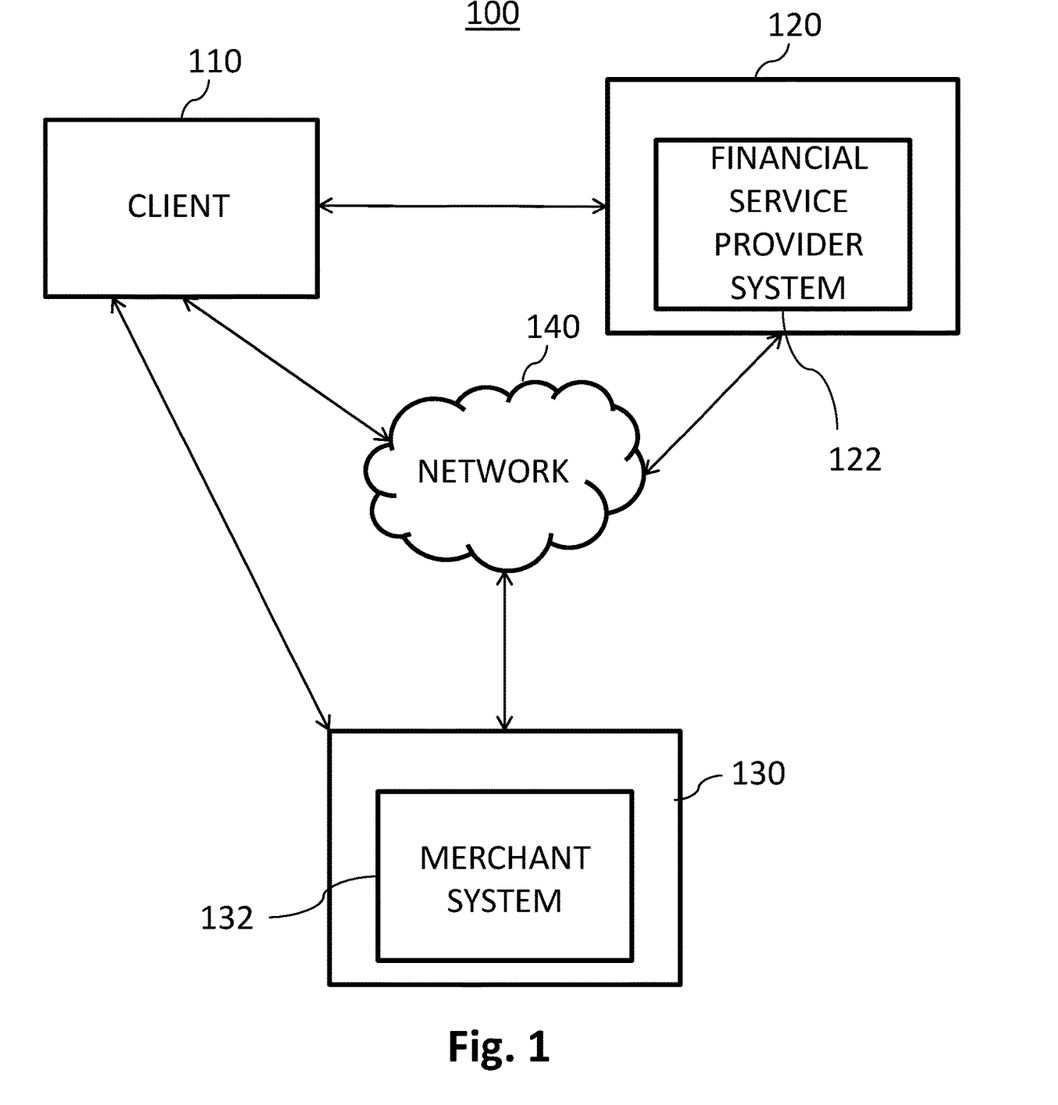
FIG. 1 illustrates an exemplary system that may be configured to perform one or more processes consistent with disclosed embodiments.

FIG. 1 is a diagram illustrating an exemplary system 100 that may be configured to perform one or more processes consistent with disclosed embodiments. In one aspect, system 100 may be configured to perform processes for extracting location information from a transaction description of a customer purchase. System 100 may include a client 110, a financial service provider 120, and a merchant 130, each communicating with a network 140. In some embodiments, one or more components of system 100 may communicate directly through a dedicated communication medium. For example, client 110 may be connected to financial service provider 120 and merchant 130 directly or via network 140. Financial service provider 120 may be connected to merchant 130 directly or via network 140. Other components known to one of ordinary skill in the art may be included in system 100 to process, transmit, provide, and receive information consistent with the disclosed embodiments. For example, system 100 may further include any other entity or source of information capable of providing information associated with a transaction between client 110 and merchant 130.

Client 110 may be one or more computing devices that is configured to perform one or more processes consistent with the disclosed embodiments. In one aspect, client 110 may be associated with a user. In one embodiment, the user may be an individual or entity that performs one or more financial transactions using one or more financial service account, such as a credit card account, a checking account, a debit account, a line of credit account, and the like. The user associated with client 110 may have a relationship with financial service provider 120. For example, the user associated with client 110 may be a customer of financial service provider 120. The user or customer associated with client 110 may use a financial service product, such as a debit card or credit card associated with a financial service account provided by financial service provider 120, to purchase items or services. In one embodiment, client 110 may be configured to perform processes that enables the customer to perform electronic purchase transactions, such as online or e-commerce type transactions. The customer associated with client 110 may perform purchase transactions involving the purchase of goods or services from a merchant, such as merchant 130. The transactions may include transactions that take place at a merchant location (e.g., brick and mortar) or electronic purchases, such as online or e-commerce based transactions. According to some embodiments, transactions descriptions may be related to other types of financial transactions, such as ATM transactions and the like.

In one aspect, client 110 may be one or more computing devices including one or more processing components that perform client device functions, such as a smart phone, a tablet, a laptop, a personal digital assistant, or another form of client device. In one embodiment, client 110 may contain one or more processors, one or more I/O devices, one or more memory devices, and other components. Client 110's memory device(s) may be configured to store information used by the client's processor to perform certain functions related to disclosed embodiments. The memory devices may be volatile or non-volatile, and may be removable. In one embodiment, client 110 may be associated with a user. In certain examples, the user may be a consumer or a potential consumer of financial service provider 120 that provides financial services, such as a bank, credit card company, lender, etc.

Client 110 may connect to network 140 or other elements of system 100 through the Internet or other communication network(s) and may use one or more protocols, e.g., Universal Serial Bus (USB), Bluetooth, hardware plug-ins, WiFi and other wireless local area network (WLAN) protocols, 3G/4G/LTE and/or other wide area network (WAN) protocols.

Financial service provider 120 may be an entity that provides financial services and financial service accounts, such as a bank, credit card company, etc. In one aspect, financial service provider 120 may include a financial service provider system that is configured to perform financial service type operations and computer-based operations. In certain aspects, financial service provider 120 is referenced in connection with a financial service provider system 122 that is associated with financial service provider 120. Thus, in certain aspects, financial service provider 120 may receive and store data related to client 110 transactions. In one embodiment, financial service provider system 122 may include one or more computing systems that are located at a central location or may include computing devices that are distributed (locally or remotely). In one example, financial service provider system 122 may include a server that is configured to execute software instructions stored in one or more memory devices to perform one or more operations consistent with the disclosed embodiments.

Merchant 130 may be one or more providers of goods and/or services, such as a retailer, etc. Merchant 130 may include one or more computing systems that are configured to perform computer-implemented processes, such as a server, desktop, laptop, mobile device, etc. In one aspect, merchant 130 is described in connection with a merchant system 132. Merchant system 132 may provide Internet-based computing devices to market and sell goods and/or services over the Internet (e.g., Web servers, etc.). Merchant system 132 may include computing devices to process and handle purchase transactions at a physical location of merchant 130, such as POS terminals, local servers, etc. at a retailer location. Merchant system 132 may be configured to perform financial transaction processes, such as receiving, processing, and handling purchase transactions, payment processes, etc. associated with the sale of goods and/or services provided by merchant 130. In certain aspects, the customer associated with client 110 may purchase goods and/or services from merchant 130 using a financial service account provided by financial service provider 120. Payment processes associated with transactions involving merchant 130 and client 110 (or the customer associated with client 110) may involves communications over network 140.

Network 140 may comprise any type of computer networking arrangement used to exchange data. For example, network 140 may be the Internet, a private data network, or a virtual private network using a public network such as the Internet. Network 140 may also include a public switched telephone network ("PSTN") and/or a wireless network.

Figure 2:
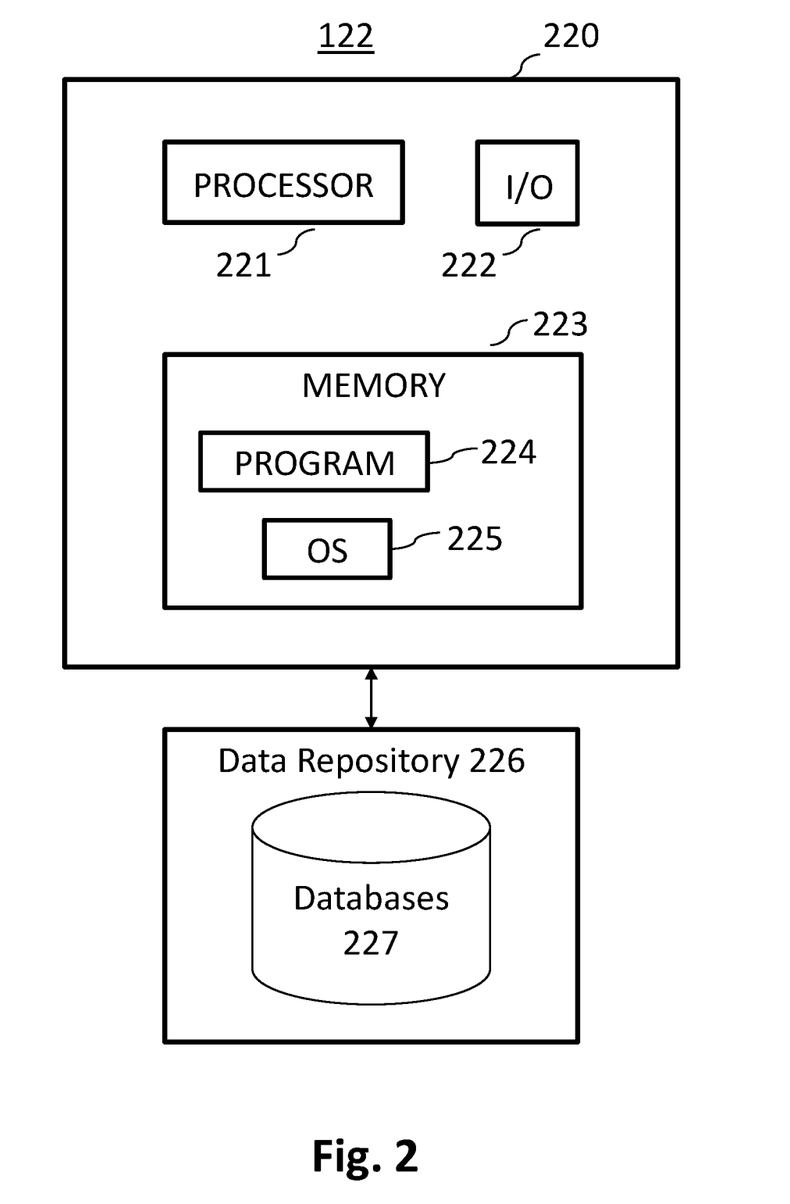
FIG. 2 illustrates another exemplary system that may be configured to perform one or more processes consistent with disclosed embodiments.

FIG. 2 shows an exemplary financial service provider system 122 that may be associated with financial service provider 120. In one embodiment, the system may include one or more servers 220 having one or more processors 221, one or more memories 223, and one or more input/output (I/O) devices 222. Alternatively, server 220 may take the form of a general purpose computer, a mainframe computer, or any combination of these components. Server 220 may be standalone, or it may be part of a subsystem, which may be part of a larger system.

Processor 221 may include one or more known processing devices, such as a microprocessor from the Pentium™ or Xeon™ family manufactured by Intel™, the Turion™ family manufactured by AMD™, or any of various processors manufactured by Sun Microsystems. Processor 221 may be configured to execute software instructions stored in memory, such as memory 223. The disclosed embodiments are not limited to the type and configuration of processor 221.

Memory 223 may include one or more storage devices configured to store instructions used by processor 221 to perform functions related to disclosed embodiments. For example, memory 223 may be configured with program 224 that performs one or more operations relating to the disclosed embodiments when executed by processor 221. The disclosed embodiments are not limited to implementing separate programs or computers configured to perform one or more operations, tasks, etc. For example, program 224 may represent a single software program that performs one or more functions when executed by processor 221. Alternatively, program 224 may comprise multiple programs that work independently or collectively to perform one or more operations consistent with the disclosed embodiments. Additionally, processor 221 may execute one or more software programs located remotely from server 220. For example, financial service provider system 120 may access one or more remote software programs that, when executed, perform one or more operations consistent with disclosed embodiments. The disclosed embodiments are not limited to any configuration, number, and/or format of program 224, or any software instructions executed by processor 221.

In one embodiment, memory 223 may also be configured with operating system software 225 that performs, when executed by one or more processors (e.g., processor 221) well known operating system operations. By way of example, the operating system may be Microsoft Windows™, Unix™, Linux™, Solaris™, or some other operating system. The choice of operating system, and even the use of an operating system, is not critical to any disclosed embodiment.

I/O devices 222 may be one or more devices that are configured to allow data to be received and/or transmitted by server 220. I/O devices 222 may include one or more digital and/or analog communication devices that allow server 220 to communicate with other machines and devices, such as customers 110.

Server 220 may also be communicatively connected to one or more data repositories 226 as shown in FIG. 2. Server 220 may be communicatively connected to data repositories 226 through network 140. Data repository 226 may include one or more files or databases 227 that store information and are accessed and/or managed through server 220. By way of example, databases 227 may be Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, financial service provider 120 may include data repository 226. Alternatively, data repository 226 may be located remotely from financial service provider 120. Further, server 220 may include data repository 226 and/or database(s) 227.

Transaction descriptions consistent with the disclosed embodiments may relate to financial transactions by client 110. A financial transaction may include, for example: one or more purchase transactions that take place at a physical location of merchant 130, one or more purchase transactions via an online merchant 130 (e.g., online transactions involving a Web site provided by one or more servers associated with merchant 130), one or more Automated Teller Machine (ATM) transactions (e.g., fund withdrawal, account status check, bill payment, deposit transaction, etc.), one or more financial service transactions that takes place at a physical location of financial service provider 120, such as, for example, a branch of financial service provider 120 (e.g., fund withdrawal, bill payment, deposit transaction, account status check, etc. at a branch location of a bank), one or more financial service transactions (e.g., fund withdrawal, bill payment, deposit transaction, account status check, etc.) involving an online banking system associated with financial service provider 120 (e.g., a Web site that provides financial services for customers of financial service provider 120), one or more transactions involving the use of a mobile application, such as for example, where client 110 is a mobile phone that executes a mobile application that allows the customer to perform one or more transactions (e.g., online banking transactions, purchases, etc.), and the like.

When the transaction is a purchase, it may occur in-person or over the internet. Purchases may include the use of, for example, credit or debit card transactions. In some embodiments, purchases may include the use of gift cards, store credit, and the like. For each purchase, transaction data may be sent to financial service provider 120 via network 140. The transaction data may include information related to the purchase, such as, for example: time information relating to a time when the financial transaction was performed (e.g., when a purchase transaction was initiated, completed, or processed for payment, etc.), date information relating a date when the financial transaction was performed (e.g., information reflecting the day, month, year, and/or day of week, etc.), fund amount information relating to a monetary amount involved in the financial transaction, such as, for example, the purchase amount for a purchase transaction, the deposit amount for a deposit transaction, a withdrawal amount for a withdrawal transaction, etc., location information relating to the location of where the financial transaction occurred, such as for example, geographic location information (e.g., city, state, country, zip code, latitude/longitude information, GPS coordinates, etc.) of a merchant 130 where the customer performed a purchase transaction, of financial service provider 130 location (e.g., bank branch), of the customer's location when performing an online financial transaction (e.g., online banking, online purchase, etc.), or any other type of information associated with a purchase.

The transaction data may also include a transaction description corresponding to the transaction. For example, if the transaction is a purchase at merchant 130, in addition to the information listed above, an alphanumeric string providing transaction information about the purchase itself may be sent to financial service provider 120. This transaction information in the transaction description may include one or more of, for example: merchant name, location of purchase (e.g., city, state, zip code, and/or country), merchant telephone number, and/or any other type of information associated with the purchase.

The specific content and format of a given set of transaction descriptions may widely vary, depending on the merchants 130 from which the transactions originate. For example, for each transaction description, the merchant name itself may be located anywhere in the alphanumeric string and may comprise the merchant name in full or a shortened form. Location information may include, for example, the names of the city, state, and/or country in which the merchant is located, character codes representing location (e.g., zip code, city code, state code, country code), or some combination of location names and numeric codes. Further, additional information included in the transaction description may be merchant-specific data. The scenarios described above are only examples of possible variations in transaction descriptions and should not be considered as limiting. Further, regardless of the exact differences between given transaction descriptions, it may be desirable for the financial service provider 120 to "clean up" the transaction descriptions that it receives as a result of purchases by client 110 at a merchant 130 by extracting location information from the transaction description.

Figure 3:
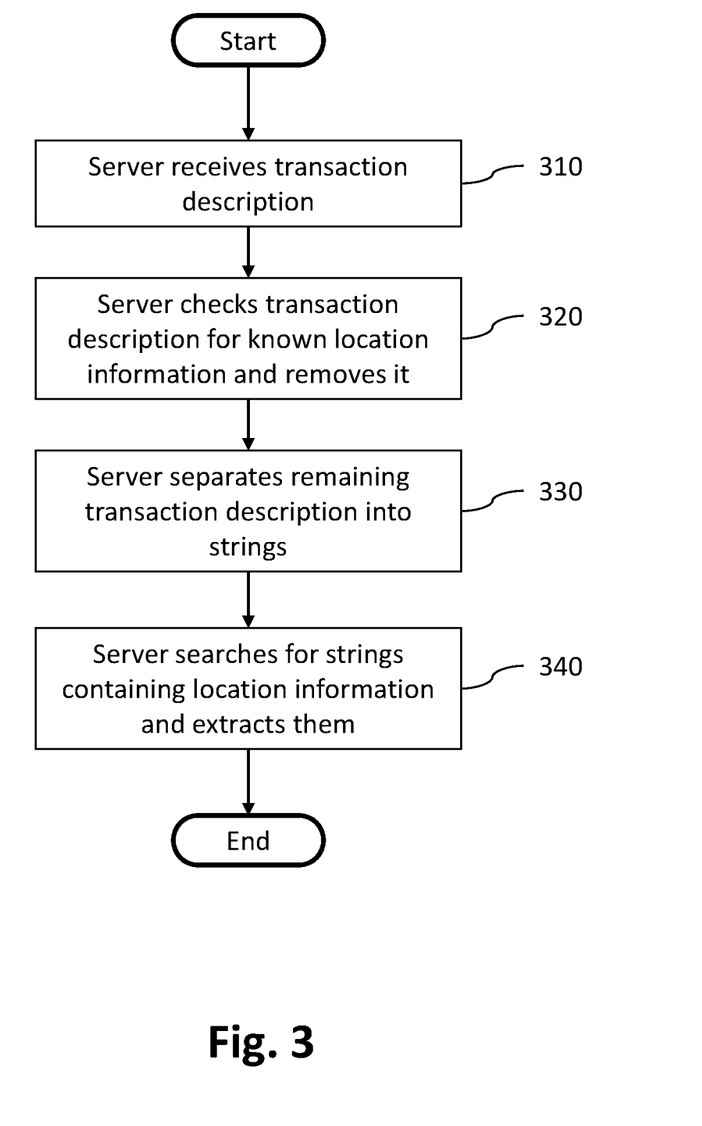
FIG. 3 depicts a flowchart of an exemplary method for extracting location information from a transaction description, consistent with disclosed embodiments.

FIG. 3 depicts a flowchart of an exemplary method for extracting location information from a transaction description. For ease of discussion, embodiments are described in connection with the extraction of location information. It is to be understood, however, that disclosed embodiments are not limited to extracting location information and may, in fact, be applied in other contexts.

In step 310, server 220 of financial service provider 120 may receive a transaction description associated with a purchase by client 110 at a merchant 130. In step 320, server 220 may check the transaction description for known location information. For example, one or more of the city, state, region, country or zip code of the location information may be identified by separate means by financial service provider 120. In some embodiments, server 220 may loop through the description, looking for each piece of known location information. Each time a matching piece of location information is identified, server 220 may remove it from the transaction description. Step 320 will be described in more detail below with respect to FIG. 4. In step 330, server 220 may split the remaining transaction description into separate strings. Server 220 may split the transaction description into separate strings, for example, by splitting the transaction description according to spaces, punctuation marks (e.g., periods, slashes, parenthesis, etc.), or other predetermined character. In step 340, server 220 may analyze each separated string to identify location information. For example, server 220 may identify a string as a zip code location of merchant 130. Step 340 will be described in more detail below with respect to FIG. 5. Each time a string is identified as location information, server 220 may extract that string from the transaction description (i.e., server 220 may remove the string and store it for possible use). Server 220 may cleanse location information from the transaction description so that, for example, the transaction description may be more easily utilized for further use. In some embodiments, for example, cleansing the transaction description may isolate a merchant name. In some instances, server 220 may remove extraneous information (e.g., merchant-specific codes or information) from the transaction description to further clean the transaction description and possibly isolate a merchant name or other desired information.

Figure 4:
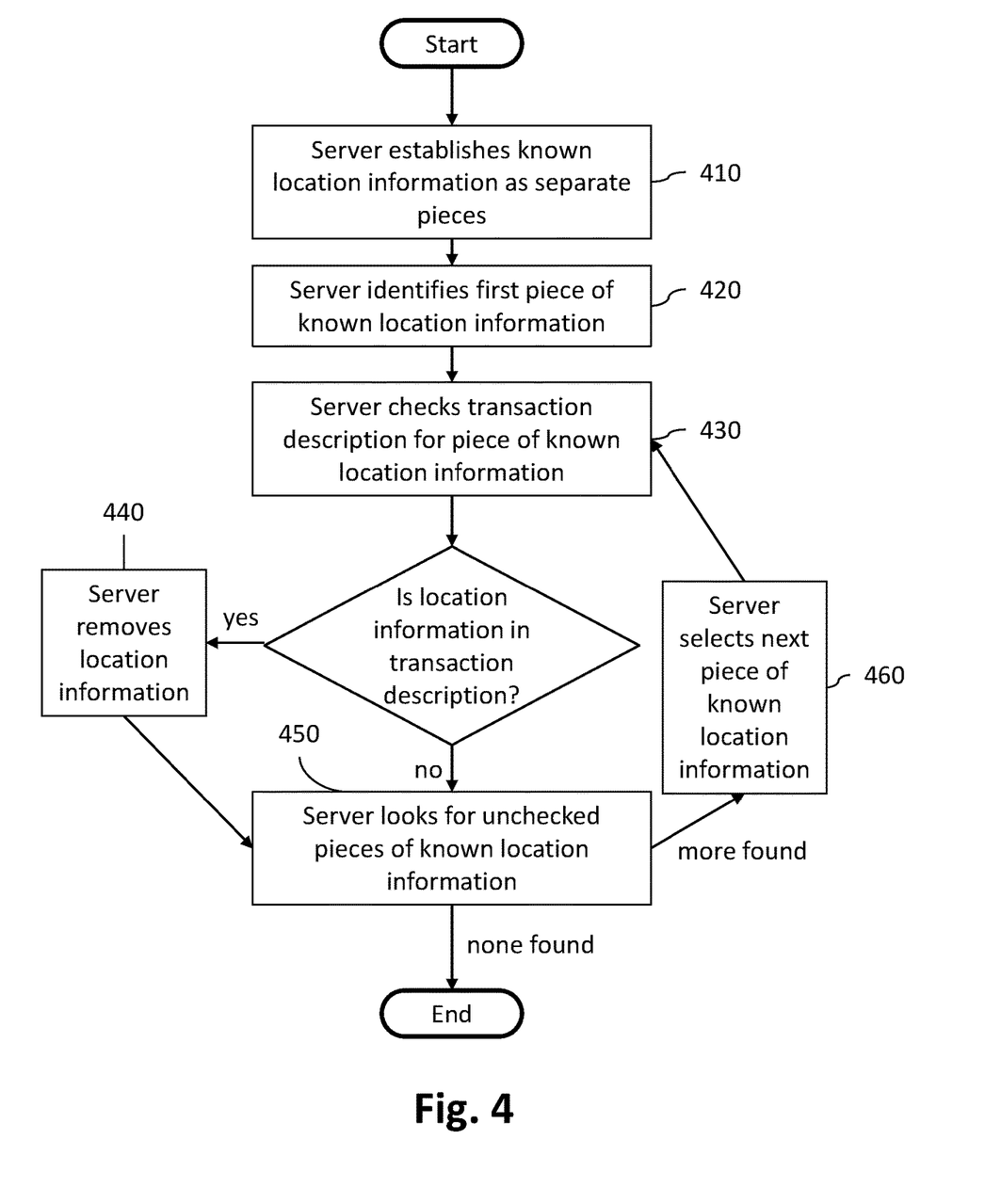
FIG. 4 depicts a flowchart of an exemplary method for removing known location information from a transaction description, consistent with disclosed embodiments.

FIG. 4 depicts a flowchart of an exemplary method for removing known location information from a transaction description. In step 410, server 220 may establish known location information that is associated with a transaction description as distinct pieces of information. Each piece of known location information may be, for example, an alphanumeric string associated with a location identifier. The known location information may be supplied by merchant 130 or other source separate from the transaction description. The known location information may vary among transactions. Server 220 may supplement the known location information by associating each piece of information with possible location aliases or abbreviations. For example, if the merchant 130 location state is known, the numeric state code associated with that state may also be considered as known location information. In another illustrative example, if the merchant 130 is known to be located in New York City, server 220 may consider the boroughs of New York City (e.g., Manhattan) or the abbreviation "NYC" as known location information. After all pieces of location information are established, server 220 may select a first piece of known location information in step 420. In step 430, server 220 may check the transaction description for the piece of known location information. Server 220 may check for the location information by searching the transaction description for an alphanumeric string that matches the location information string. If a match is found, server 220 may remove the string from the transaction description in step 440. If no match is found, in step 450, server 220 may confirm that all pieces of known location information have been checked against the transaction description. If there are additional pieces of known location information, server 220 may select one of the remaining pieces of known location information (step 460) and repeat step 430. Once server 220 determines that all pieces of known location information have been checked against the transaction description, server 220 may retain the remaining transaction description and may begin searching for unknown location information, as further described below.

Figure 5:
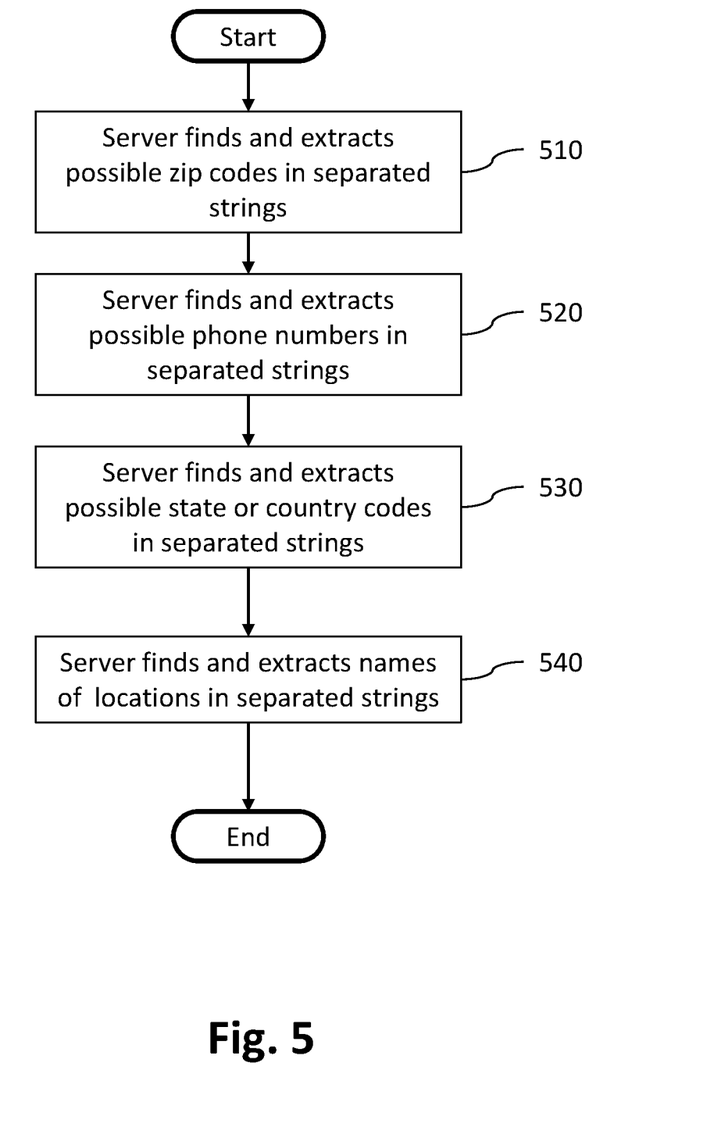
FIG. 5 depicts a flowchart of an exemplary method for analyzing and extracting unknown location information from a transaction description, consistent with disclosed embodiments.

FIG. 5 depicts a flowchart of an exemplary method for analyzing and extracting unknown location information from a transaction description. In some embodiments, the transaction description may have already been separated into strings, as in step 330 of FIG. 3. In step 510, server 220 may identify and extract possible zip codes in the separated strings. Server 220 may, for example check for strings containing 5 numbers, 9 numbers, or 5 numbers followed by a '-' and 4 numbers (common zip code formats). If a string with this format is found, server 220 may check the numbers against known zip codes (in this instance, "known" zip codes refers to zip codes that are known to server 220 as zip codes in use for the relevant country). If the string contains a known zip code, server 220 may extract that string from the transaction description, and retain the string as a possible zip code location for the transaction. In step 520, server 220 may identify and extract possible telephone numbers in the remaining separated strings. For example, server 220 may check for known telephone number formats for the expected location country. For example, if the transaction is known or suspected to have occurred in the U.S., server 220 may search for strings that appear to utilize common U.S. telephone number formats (e.g., XXX-XXX-XXXX, where X is any number). If such a string is found, server 220 may extract that string by removing it from the transaction description and retaining/storing it as a possible phone number. Further, if a possible phone number is found, server 220 may continue the analysis to collect additional information from the phone number, as will be further described. In step 530, server 220 may identify and extract possible state and country codes in the remaining separated strings. For example, server 220 may search for 2-character strings and check them against known country and state codes (in this instance, "known" country and state codes refers to codes that are known to server 220 as state or country codes in existence). For example, server 220 may check for two-character strings that may represent official United States Postal Service abbreviations (e.g., VA, PA, DC, etc.). If any state or country codes are identified, server 220 may remove the relevant string from the transaction description and retain/store it as possible location information for the transaction. In step 540, server 220 may check the remaining strings for names of locations. For example, server 220 may check each string for names or abbreviations of countries (e.g., USA, Canada, etc.), names or abbreviations of states (e.g., Pennsylvania, Penn., etc.), or names of cites, regions, suburbs, etc. If a string is identified to contain a location name, server 220 may remove the string and retain/store it as possible location information for the transaction. The information may be retained in the same name location category in which it was found (e.g., a string found to contain New York City being retained as a possible "location city").

Server 220 may also retain/store the cleansed location information for further use. For example, server 220 may store and associate cleansed location information data with merchant information for use in identifying merchants 130 with which client 110 transacted. This information may be useful in creating automated systems for generating targeted advertising suggestions, for example. Other uses for the cleansed transaction description are contemplated.

It is further possible to utilize the unknown location information extracted from the transaction description to supplement the known location information for a given transaction. For example, if zip codes, state or country codes, or location names are extracted from the separated strings of a given transaction description, these may be added to fill-in missing elements of the known location information for a given transaction. For instance, server 220 may only have information identifying a U.S. state in which the transaction occurred before searching for unknown location information in the transaction description. If a possible zip code is found in the transaction description, this information may be used to further specify the location within the state that the transaction occurred. Further, server 220 may check the zip code against the known state to confirm that it is likely a zip code (i.e., if the zip code represents a location within the state, it is likely that the string is correctly identified as a zip code).

A similar utilization of possible telephone numbers within the transaction description may be possible. For example, if a string is determined to be in the format of a ten-digit U.S. telephone number, the first three digits may be assumed to represent the area code. Similar to the description above, the area code may be utilized to fill in missing geographic location information.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims.

What is claimed is:

1. A system for generating cleansed transaction descriptions based on extracting information from transaction descriptions of varying formats received in response to completed transactions, comprising:
a server configured to cleanse transaction descriptions comprising one or more processors; and non-transitory computer-readable media comprising instructions that, when executed by the one or more processors, cause operations comprising:
receiving, from a merchant device over a computer network, a transaction description associated with a completed transaction, the transaction description including a first alphanumeric string;
determining, at the server, from the transaction description, a merchant identifier associated with the transaction description;
receiving, from the merchant device over the computer network, a known merchant-specific code;
determining, at the server, that the known merchant-specific code provided by the merchant device corresponds to the determined merchant identifier;
generating, at the server, at least one second alphanumeric string based on the known merchant-specific code;
parsing, at the server, the first alphanumeric string for matches to the at least one second alphanumeric string;
identifying, at the server, a merchant-specific code based on matching the at least one second alphanumeric string to a portion of the first alphanumeric string; and
generating, at the server, based on identifying the merchant-specific code, a cleansed transaction description by removing the portion of the first alphanumeric string from the first alphanumeric string of the transaction description.

2. A method for generating cleansed transaction descriptions based on extracting information from transaction descriptions of varying formats received in response to completed transactions, the method comprising:
receiving, at a server, a transaction description, from a merchant device over a computer network, associated with a completed transaction, the transaction description including a first alphanumeric string;
determining, at the server from the transaction description, a merchant identifier associated with the transaction description;
determining, at the server, that a known merchant-specific code, received from the merchant device over the computer network, corresponds to the determined merchant identifier;
generating, at the server, at least one second alphanumeric string based on the known merchant-specific code;
parsing, at the server, the first alphanumeric string for matches to the at least one second alphanumeric string;
identifying, at the server, a merchant-specific code based on matching the at least one second alphanumeric string to a portion of the first alphanumeric string; and
generating, at the server, based on identifying the merchant-specific code, a cleansed transaction description by removing the portion of the first alphanumeric string from the first alphanumeric string of the transaction description.

3. The method of claim 2, wherein the completed transaction is an automated teller machine transaction.

4. The method of claim 2, wherein the completed transaction is a web-based transaction.

5. The method of claim 2, wherein the first alphanumeric string, the at least one second alphanumeric string, and the known merchant-specific code are stored in association with an identifier of a client involved in the completed transaction.

6. The method of claim 2, further comprising:
identifying additional information by comparison to one or more of stored patterns; and
removing the additional information.

7. The method of claim 6, wherein the stored patterns include telephone numbers.

8. The method of claim 6, wherein the stored patterns include zip codes.

9. The method of claim 6, wherein the stored patterns include state abbreviations.

10. The method of claim 2, further comprising:
extracting, based on the identification of the merchant-specific code, the merchant-specific code.

11. The method of claim 2, further comprising:
removing, based on the identification of the merchant-specific code, the at least one second alphanumeric string from the first alphanumeric string.

12. The method of claim 2, further comprising:
storing the cleansed transaction description in a database associated with the server.

13. The method of claim 2, further comprising:
generating a third alphanumeric string based on the known merchant-specific code that is different from the at least one second alphanumeric string; and
parsing the first alphanumeric string for matches to the third alphanumeric string.

14. The method of claim 13, further comprising:
identifying a second merchant-specific code based on matching the third alphanumeric string to the portion of the first alphanumeric string.

15. The method of claim 13, further comprising:
in response to failing to identify a match between the third alphanumeric string and the portion of the first alphanumeric string, identifying additional information by comparison to one or more of stored patterns, wherein a match is failed to be identified between the third alphanumeric string and the portion of the first alphanumeric string; and
removing the additional information.

16. One or more non-transitory computer-readable media storing instructions that, when executed by one or more processors, cause operations comprising:
receiving, at a server, a transaction description, from a merchant device over a computer network, associated with a completed transaction, the transaction description including a first alphanumeric string;
determining, at the server, from the transaction description, a merchant identifier associated with the transaction description;
determining, at the server, that a known merchant-specific code, received from the merchant device over the computer network, corresponds to the determined merchant identifier;
generating, at the server, at least one second alphanumeric string based on the known merchant-specific code;
parsing, at the server, the first alphanumeric string for matches to the at least one second alphanumeric string;
identifying, at the server, a merchant-specific code based on matching the at least one second alphanumeric string to a portion of the first alphanumeric string; and
generating, at the server, based on identifying the merchant-specific code, a cleansed transaction description by removing the portion of the first alphanumeric string from the first alphanumeric string of the transaction description.

17. The media of claim 16, wherein the completed transaction is an automated teller machine transaction.

18. The media of claim 16, wherein the completed transaction is a web-based transaction.

19. The media of claim 16, wherein the first alphanumeric string, the at least one second alphanumeric string, and the known merchant-specific code are stored in association with an identifier of a client involved in the completed transaction.

20. The media of claim 16, wherein the instructions that, when executed by the one or more processors, further cause operations comprising:
identifying additional information by comparison to one or more of stored patterns; and removing the additional information.

* * * * *